United States Patent
Gao (10) Patent No.: US 9,210,124 B2
(45) Date of Patent: Dec. 8, 2015

(54) METHOD, APPARATUS, AND SYSTEM FOR ALLOCATING PUBLIC IP ADDRESS

(71) Applicant: Huawei Technologies Co., Ltd., Shenzhen, Guangdong (CN)

(72) Inventor: Hongliang Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 420 days.

(21) Appl. No.: 13/715,326

(22) Filed: Dec. 14, 2012

(65) Prior Publication Data

US 2013/0166776 A1 Jun. 27, 2013

(30) Foreign Application Priority Data

Dec. 20, 2011 (CN) .......................... 2011 1 0430365

(51) Int. Cl.
G06F 15/16 (2006.01)
H04L 29/12 (2006.01)
G06F 11/07 (2006.01)

(52) U.S. Cl.
CPC ........ *H04L 61/2532* (2013.01); *G06F 11/0769* (2013.01); *H04L 61/2007* (2013.01); *H04L 61/2514* (2013.01); *H04L 61/2015* (2013.01)

(58) Field of Classification Search
CPC .................................................. G06F 11/0769
USPC ....................................................... 709/245
See application file for complete search history.

(56) References Cited

U.S. PATENT DOCUMENTS

| 7,227,872 | B1 | 6/2007 | Biswas et al. | |
|---|---|---|---|---|
| 8,289,968 | B1 | 10/2012 | Zhuang | |
| 2006/0153211 | A1 | 7/2006 | Fujino | |
| 2008/0205415 | A1* | 8/2008 | Morales | 370/401 |
| 2009/0037603 | A1* | 2/2009 | Battello et al. | 709/245 |
| 2010/0278070 | A1* | 11/2010 | Melia et al. | 370/254 |

(Continued)

FOREIGN PATENT DOCUMENTS

| CN | 101068208 A | 11/2007 |
|---|---|---|
| CN | 101247421 A | 8/2008 |

(Continued)

OTHER PUBLICATIONS

Extended European Search Report in corresponding European Patent Application No. 12190479.1 (Mar. 19, 2013).

(Continued)

*Primary Examiner* — Hamza Algibhah
(74) *Attorney, Agent, or Firm* — Leydig, Voit & Mayer, Ltd.

(57) ABSTRACT

An embodiment of the present invention provides a method for allocating a public IP address, including: receiving, by a CGN, a user on-line packet, and judging whether an idle public IP address exists; when the public IP address pool doesn't have an idle public IP address, constructing and sending, a DHCP Request packet to a DHCP Server, and requesting obtaining a public IP address set; and allocating, a first public IP address in the public IP address set to the user. Embodiments of the present invention further provide an apparatus and a system for allocating a public IP address. Unified management and allocation of the public IP address of the CGN device can be implemented through the method, the apparatus, and the system provided in the embodiments of the present invention. The utilization ratio of the public IP address of the CGN device can be effectively improved.

12 Claims, 3 Drawing Sheets

| Code identifier | Length | Client identifier | The number of applied addresses | ... |
|---|---|---|---|---|

(56) References Cited

U.S. PATENT DOCUMENTS

| | | | |
|---|---|---|---|
| 2010/0309915 A1* | 12/2010 | Pirbhai et al. | 370/392 |
| 2011/0047256 A1 | 2/2011 | Babu et al. | |
| 2011/0268121 A1 | 11/2011 | Karino | |
| 2012/0020359 A1 | 1/2012 | Jiang | |
| 2012/0297087 A1* | 11/2012 | Humble et al. | 709/238 |
| 2013/0067110 A1* | 3/2013 | Sarawat et al. | 709/238 |

FOREIGN PATENT DOCUMENTS

| | | |
|---|---|---|
| CN | 101527740 A | 9/2009 |
| CN | 101977250 A | 2/2011 |
| CN | 102594933 A | 7/2012 |
| JP | 2006197255 A | 7/2006 |
| JP | 2008035548 A | 2/2008 |
| JP | 2010057028 A | 3/2010 |
| JP | 2010263622 A | 11/2010 |
| JP | 2011142455 A | 7/2011 |
| WO | WO 2010057386 A1 | 5/2010 |
| WO | WO 2010111962 A1 | 10/2010 |
| WO | WO 2010119738 A1 | 10/2010 |

OTHER PUBLICATIONS

Perreauit et al., "Common Requirements for Carrier Grade NATs (CGNs)," Nov. 30, 2011, IETF Trust, IETF, Fremont, California.

Tsuchiya et al., "Extending the IP Internet Through Address Reuse," 1993, ACM, New York, New York.

"[Behave] pRE: CGN REQ: Shared address pool," http://www.ietf.org/mail-archive/web/behave/current/mg09518.html, Accessed Feb. 26, 2013, Internet Engineering Task Force, Fremont, California.

International Search Report in corresponding PCT Patent Application No. PCT/CN2012/080559 (Dec. 6, 2012).

* cited by examiner

METHOD, APPARATUS, AND SYSTEM FOR ALLOCATING PUBLIC IP ADDRESS

CROSS-REFERENCE TO RELATED APPLICATION

This application claims priority to Chinese Patent Application No. 201110430365.4, filed on Dec. 20, 2011, which is hereby incorporated by reference in its entirety.

FIELD OF THE INVENTION

The embodiments of the present invention relate to the field of communications technologies, and in particular, to a method, an apparatus, and a system for allocating a public IP address.

BACKGROUND OF THE INVENTION

An carrier-grade network address translation (Carrier-Grade Network Address Translation, CGN) device is located within a carrier, located at the boundary between a public network and a private network, and used for providing high-performance translation from a private address of an Internet protocol version 4 (Internet Protocol Version 4, IPv4) to a public address of IPv4; public network IPv4 addresses can be saved effectively while it is implemented that a private network user accesses the public network; the speed of consuming the IPv4 addresses can be slowed down by using the CGN technology, so as to get prepared for true transition to an Internet protocol version 6 (Internet Protocol Version 6, IPv6). Currently, the CGN device manages a public IP address based on a CGN board. It is required to statically configure a public IP address pool for every CGN board in advance. When a user goes on-line through a certain CGN board, the CGN board allocates a public IP address to the user through the pre-configured public IP address pool on the CGN board. When the user's traffic load sharing between CGN boards is unbalanced, it appears that the pre-configured public IP addresses of some CGN boards are exhausted while many pre-configured public IP address pools of some CGN boards are idle, so as to result in the waste and the low utilization ratio of the public IP addresses.

SUMMARY OF THE INVENTION

Embodiments of the present invention provide a method, an apparatus, and a system for allocating a public IP address, so as to solve a problem that the waste and the low utilization ratio of the public IP address occurs when a user's traffic load sharing between CGN boards is unbalanced on a CGN device.

An embodiment of the present invention provides a method for allocating a public IP address of a CGN device, including:

receiving, by a CGN carrier-grade network address translation device, a user on-line packet, and judging whether an idle public IP address exists in a public IP address pool;

when the public IP address pool doesn't have an idle public IP address or the number of idle public IP addresses is less than a preset threshold value of the number of the idle public IP addresses, constructing and sending, by the CGN device, a DHCP Request packet to a DHCP Server, requesting obtaining a public IP address set, and storing each public IP address of the public IP address set into the public IP address pool; and allocating, by the CGN device, a first public IP address of the public IP address set to a user.

An embodiment of the present invention provides an apparatus for allocating a public IP address, including:

a judging unit, configured to receive a user on-line packet, and judge whether an idle public IP address exists in a public IP address pool;

a requesting unit, configured to send a DHCP Request packet to a DHCP Server when the judging unit judges that the public IP address pool doesn't have an idle public IP address, request obtaining a public IP address set, and store each public IP address of the public IP address set into the public IP address pool; and an allocating unit, configured to allocate a first public IP address in the public IP address set to a user.

An embodiment of the present invention provides a system for allocating a public IP address, where the system includes an apparatus for allocating a public IP address provided in the embodiment of the present invention.

In conclusion, the embodiments of the present invention provide a method, an apparatus, and a system for allocating a public IP address. Unified management and allocation of the public IP address of the CGN device can be implemented through the method, the apparatus, and the system for allocating the public IP address provided in the embodiments of the present invention. The utilization ratio of the public IP address of the CGN device can be effectively improved by applying to the DHCP Server for the public IP address and releasing the public IP address dynamically, so that the waste of the public IP address is avoided.

BRIEF DESCRIPTION OF THE DRAWINGS

To illustrate the technical solutions in the embodiments of the present invention or in the prior art more clearly, the accompanying drawings required for describing the embodiments or the prior art are briefly introduced in the following. Apparently, the accompanying drawings in the following description are merely some embodiments of the present invention, and persons of ordinary skill in the art can further derive other drawings according to the accompanying drawings without making creative efforts.

DETAILED DESCRIPTION OF THE EMBODIMENTS

To make the objectives, technical solutions, and advantages of the embodiments of the present invention clearer, the technical solutions according to the embodiments of the present invention are clearly and completely described in the following with reference to the accompanying drawings in the embodiments of the present invention. Apparently, the embodiments in the following description are a part of the embodiments rather than all of the embodiments of the present invention. All other embodiments obtained by persons of ordinary skill in the art based on the embodiments of the present invention without making creative efforts shall fall within the protection scope of the present invention.

Embodiment 1

Figure 1:
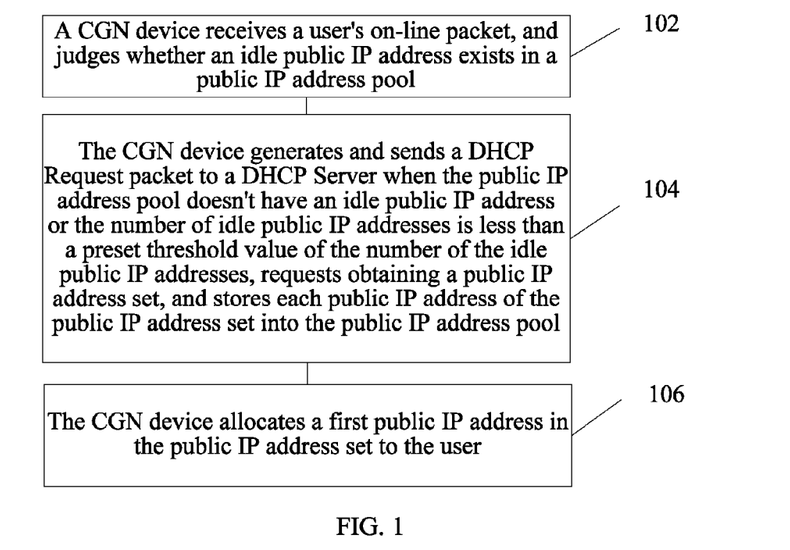
FIG. 1 is a schematic flow chart of a method for allocating a public IP address according to a first embodiment of the present invention.
Figure 2:
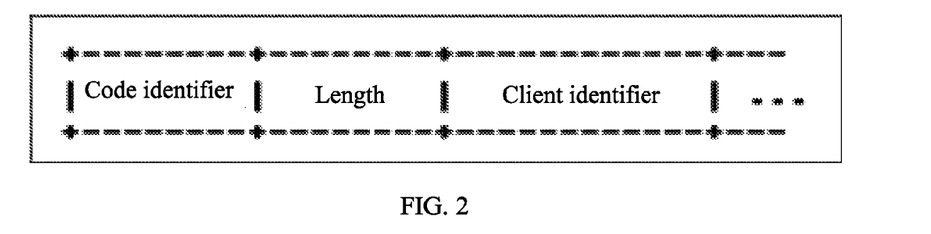
FIG. 2 is a schematic diagram of the Code 61 option part of a DHCP packet in the prior art.
Figure 3:
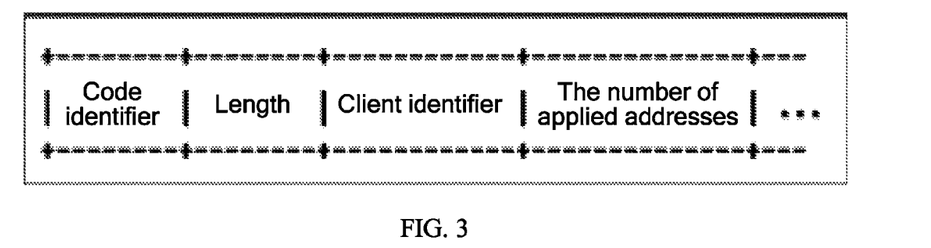
FIG. 3 is a schematic diagram of the Code 61 option part of an extended DHCP packet according to an embodiment of the present invention.

An embodiment of the present invention provides a method for allocating a public IP address. Referring to FIG. 1, FIG. 1 is a flow chart of the method of the embodiment of the present invention, and the method including:

102: A CGN device receives a user on-line packet, and judges whether an idle public IP address exists in a public IP address pool;

104: The CGN device constructs and sends a DHCP Request packet to a DHCP Server when the public IP address pool doesn't have an idle public IP address or the number of idle public IP addresses is less than a preset threshold value of the number of the idle public IP addresses, requests obtaining a public IP address set, and stores each public IP address of the public IP address set into the public IP address pool;

When a user goes on-line, the CGN device receives the user on-line packet, where the user on-line packet is used to obtain a public IP address for the user. In the embodiment of the present invention, the public IP address pool is managed at the CGN device in a unified manner, and the public IP address allocation is performed for an on-line user of each CGN board in a unified manner. The public IP addresses which are allocated by the CGN device to users and the public IP addresses which are not allocated by the CGN device to users are stored in the public IP address pool. Each public IP address includes a user occupancy flag. The user occupancy flag is used to identify whether the public IP address is allocated to a user. The user occupancy flag has two values: an occupied state, used to identify that the public IP address is allocated to a user; and an idle state, used to identify that the public IP address is not allocated to a user. In a default situation, the user occupancy flag is in the idle state. For example, when a certain public IP address is allocated to a certain user, the user occupancy flag of the public IP address is set to the occupied state; and after the user is off-line, the user occupancy flag of the public IP address is set to the idle state. The CGN device judges, after receiving the user on-line packet, whether an idle public IP address exists in the public IP address pool, and if an idle public IP address exists and the number of the idle public IP addresses is not less than the preset threshold value of the number of the idle public IP addresses, selects an idle public IP address and allocates the idle public IP address to the user; when the public IP address pool doesn't have an idle public IP address or the number of the idle public IP addresses is less than the preset threshold value of the number of the idle public IP addresses, the CGN device simulates a dynamic host configuration protocol (Dynamic Host Configuration Protocol, DHCP) client to construct and send a DHCP Request packet to the DHCP Server so as to request obtaining the public IP address set, where a destination address of the DHCP Request packet may be 0XFFFFFFFF, and the DHCP packet is sent to all DHCP Servers which are connected to the CGN device in a broadcast manner. Preferentially, the CGN device pre-configures the DHCP Server address corresponding to the CGN device, and the destination address of the DHCP Request packet is the pre-configured DHCP Server address. The CGN device stores each public IP address of the public IP address set into the public IP address pool on the CGN device. The public IP address set may include one or more public IP addresses. The preset threshold value of the number of the idle public IP addresses may be self-defined according to an actual situation, and in the default situation, the threshold value is 1. The CGN device may apply, while sending the DHCP Request packet, to the DHCP Server for one or more public IP addresses, and an advantage of applying for multiple public IP addresses once is: when multiple users are on-line at the same time at the peak hour of service traffic, the multiple users may be enabled to access the Internet as soon as possible, the applied number of the public IP addresses once may be a fixed value or a dynamically-adjusted value, and the fixed value or the dynamically-adjusted value may be self-defined, which is not compulsorily limited in the embodiment of the present invention. When the CGN device sends the DHCP Request packet to the DHCP Server to request obtaining the public IP address set, a Code identifier 61 option field of the DHCP packet needs to be extended, so as to identify the specific number of the public IP addresses which need to be obtained. The Code 61 option part of the current DHCP packet is shown as FIG. 2, where the corresponding value of the Code is 61, and for details, reference may be made to RFC2132 of the Internet engineering task force (Internet Engineering Task Force, IETF). The extended Code 61 of the DHCP packet of the embodiment of the present invention is shown as FIG. 3, where a client identifier is an identifier of the CGN device, which may be a media access control (Media Access Control, MAC) address of the CGN device; and where a field of the number of applied addresses is further added, which is used to identify the number of the public IP addresses applied by the CGN device. The DHCP Server judges, after receiving the DHCP Request packet sent by the CGN device, the field of the number of applied addresses, and correspondingly returns the number of the public IP addresses according to a specific value of the field of the number of applied addresses.

106: The CGN device allocates a first public IP address in the public IP address set to the user.

The CGN device selects, after storing each public IP address of the public IP address set into the public IP address pool of the CGN device, the first public IP address from the public IP address set and allocates the first public IP address to the user. Further, the user occupancy flag of the first public IP address may be set to the occupied state to identify that the first public IP address is allocated to a certain user and cannot be further allocated to another user, and the first public IP address is any one of the public IP addresses in the public IP address set. Further, when the user is off-line, the user occupancy flag of the first public IP address is set to the idle state to identify that the first public IP address is not allocated to any user. At the same time, the idle time of the first public IP address starts to be recorded, and when the idle time of the first public IP address reaches a preset idle time threshold value, the CGN device sends a DHCP Release packet to the DHCP Server to release the first public IP address. For example, the preset idle time threshold value is 10 minutes; when the idle time of the first public IP address reaches 10 minutes, the CGN device sends the DHCP Release packet to the DHCP Server to release the first public IP address. Accordingly, in step 104, when the public IP address set applied by the CGN device from the DHCP Server includes multiple public IP addresses, the idle time of the public IP address which is not allocated to a user also needs to be recorded. When the recorded idle time reaches the preset idle time threshold value, the CGN device sends the DHCP Release packet to the DHCP Server to release the public IP address, so that the waste of the public IP address is avoided.

It can be seen that, unified management and allocation of the public IP address of the CGN device is implemented through the method provided in the embodiment of the present invention. The utilization ratio of the public IP address of the CGN device can be effectively improved by applying to the DHCP Server for the public IP address and releasing the public IP address dynamically, thereby avoiding the waste of the public IP address.

Embodiment 2

Figure 4:
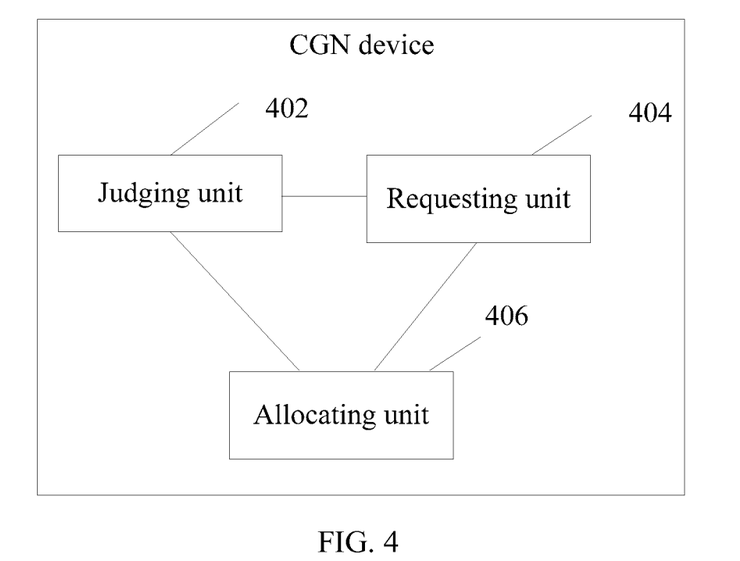
FIG. 4 is a schematic diagram of an apparatus for allocating a public IP address according to a second embodiment of the present invention.

An embodiment of the present invention provides an apparatus for allocating a public IP address. Referring to FIG. 4, FIG. 4 is a schematic diagram of an apparatus of the embodiment of the present invention. The apparatus includes a judging unit 402, a requesting unit 404, and an allocating unit 406.

The judging unit 402 is configured for a CGN device to receive a user on-line packet, and judge whether an idle public IP address exists in a public IP address pool;

The requesting unit 404 is configured for the CGN device to construct and send a DHCP Request packet to a DHCP Server when the judging unit judges that the public IP address pool doesn't have an idle public IP address or the number of idle public IP addresses is less than a preset threshold value of the number of the idle public IP addresses, request obtaining a public IP address set, and store each public IP address of the public IP address set into the public IP address pool.

When a user is on-line, the CGN device receives the user on-line packet, where the user on-line packet is used to obtain a public IP address for the user. In the embodiment of the present invention, the CGN device manages the public IP address pool in a unified manner, and performs public IP address allocation to an on-line user of each CGN board in a unified manner. The public IP addresses which are allocated by the CGN device to users and the public IP addresses which are not allocated by the CGN device to users are stored in the public IP address pool. Each public IP address includes a user occupancy flag. The user occupancy flag is used to identify whether the public IP address is allocated to a user. The user occupancy flag has two values: an occupied state, used to identify that the public IP address is allocated to a user; and an idle state, used to identify that the public IP address is not allocated to a user. In a default situation, the user occupancy flag is in the idle state. For example, when a certain public IP address is allocated to a certain user, the user occupancy flag of the public IP address is set to the occupied state; and when the user is off-line, the user occupancy flag of the public IP address is set to the idle state. The judging unit 402, after receiving the user on-line packet, judges whether an idle public IP address exists in the public IP address pool, and if an idle public IP address exists and the number of the idle public IP addresses is not less than the preset threshold value of the number of the idle public IP addresses, selects an idle public IP address and allocates the idle public IP address to the user. When the public IP address pool doesn't have an idle public IP address or the number of the idle public IP addresses is less than the preset threshold value of the number of the idle public IP addresses, the requesting unit 404 simulates a DHCP client to send a DHCP Request packet to the DHCP Server to request obtaining the public IP address set, and a destination address of the DHCP Request packet may be 0XFFFFFFFF, and the DHCP packet is sent to all DHCP Servers which are connected to the CGN device in a broadcast manner. The requesting unit 404 stores each public IP address of the public IP address set into the public IP address pool on the CGN device. The public IP address set may include one or more public IP addresses. The preset threshold value of the number of the idle public IP addresses may be self-defined according to an actual situation, and in a default situation, the threshold value is 1. The requesting unit 404 may apply to the DHCP Server for one or more public IP addresses while sending the DHCP Request packet, and an advantage of applying for multiple public IP addresses once is: when multiple users are on-line at the same time at the peak hour of service traffic, the multiple users may be enabled to access the Internet as soon as possible, and the number of the public IP addresses applied once may be a fixed value or a dynamically-adjusted value, and the fixed value or the dynamically-adjusted value may be self-defined, which is not compulsorily limited in the embodiment of the present invention. When the requesting unit 404 of the CGN device sends the DHCP Request packet to the DHCP Server to request obtaining the public IP address set, a Code identifier 61 option field of the DHCP packet needs to be extended, so as to identify the specific number of the public IP addresses which need to be obtained. The Code 61 option part of the current DHCP packet is shown as FIG. 2, where the corresponding value of the Code is 61, and for details, reference may be made to RFC2132 of the Internet engineering task force (Internet Engineering Task Force, IETF). The extended Code 61 part of the DHCP packet of the embodiment of the present invention is shown as FIG. 3, where a client identifier is an identifier of the CGN device, which may be a media access control (Media Access Control, MAC) address of the CGN device; and where a field of the number of applied addresses is further added, which is used to identify the number of the public IP addresses applied by the CGN device. The DHCP Server, after receiving the DHCP Request packet sent by the requesting unit 404, judges the field of the number of applied addresses, and correspondingly returns the applied public IP addresses according to a specific value of the field.

The allocating unit 406 is configured for the CGN device to allocate a first public IP address in the public IP address set to the user.

The allocating unit 406 selects the first public IP address from the public IP address set and allocates the first public IP address to the user, sets the user occupancy flag of the first public IP address to the occupied state to identify that the first public IP address is allocated to a user and cannot be further allocated to another user, where the first public IP address is any one of the public IP addresses in the public IP address set.

Figure 5:
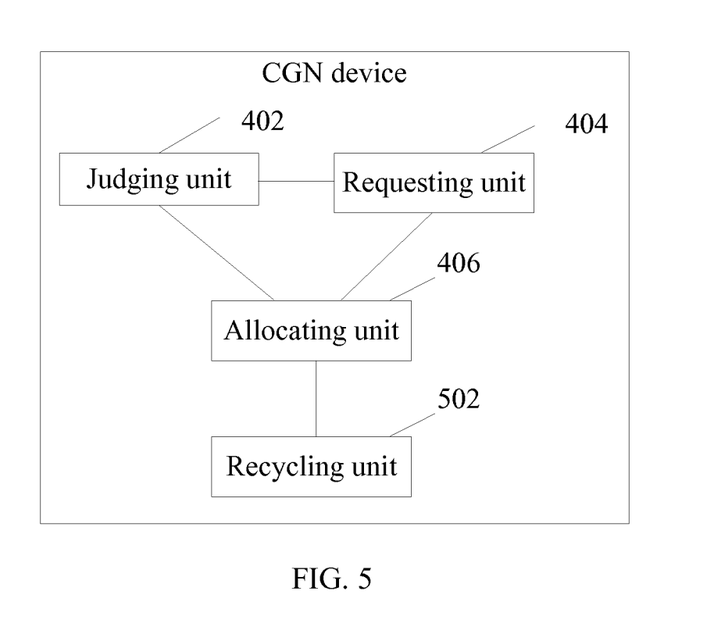
FIG. 5 is a schematic diagram of another apparatus for allocating a public IP address according to the second embodiment of the present invention.

Preferentially, the apparatus for allocating the public IP address further includes a recycling unit 502. As shown in FIG. 5, FIG. 5 is a schematic diagram of another apparatus for allocating a public IP address of a CGN device according to the embodiment of the present invention.

The recycling unit 502 is configured to set the user occupancy flag of the first public IP address to the idle state after the user is off-line, and start to record idle time of the first public IP address; when the idle time of the first public IP address reaches a preset idle time threshold value, the CGN device sends a DHCP Release packet to the DHCP Server to release the first public IP address.

When the user is off-line, the recycling unit 502 sets the user occupancy flag of the first public IP address to the idle state to identify that the first public IP address is not allocated to any user. At the same time, the recycling unit 502 starts to record the idle time of the first public IP address, and when the idle time of the first public IP address reaches the preset idle time threshold value, the recycling unit 502 sends the DHCP Release packet to the DHCP Server to release the first public IP address. For example, the preset idle time threshold value is 10 minutes; when the idle time of the first public IP address reaches 10 minutes, the recycling unit 502 sends the DHCP Release packet to the DHCP Server to release the first public IP address. Accordingly, when the public IP address set applied by the requesting unit 404 from the DHCP Server includes multiple public IP addresses, the recycling unit 502 also needs to record the idle time of the public IP address which is of the multiple public IP addresses and is not allocated to a user. When the recorded idle time reaches the preset idle time threshold value, the recycling unit 502 sends the DHCP Release packet to the DHCP Server to release the public IP address, so that the waste of the public IP address is avoided.

Figure 6:
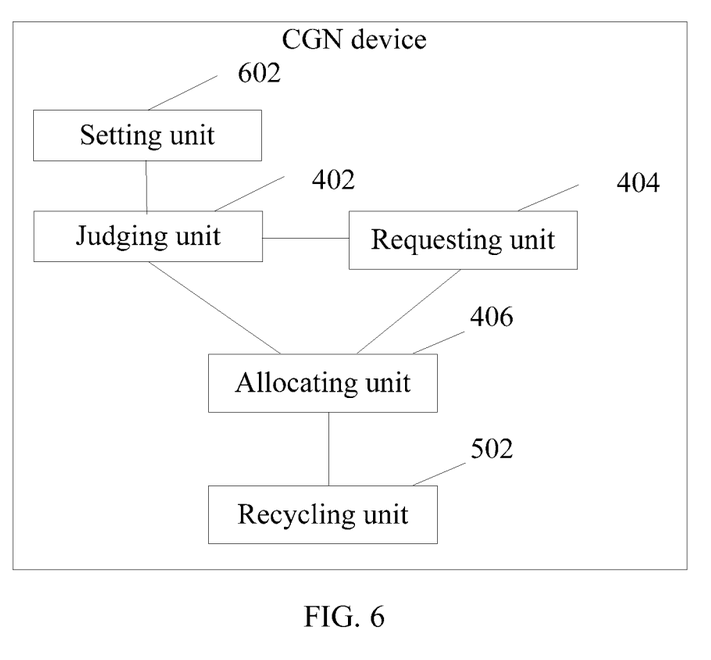
FIG. 6 is a schematic diagram of a third apparatus for allocating a public IP address according to the second embodiment of the present invention.

Further, the apparatus for allocating the public IP address further includes a setting unit 602, as shown in FIG. 6. FIG. 6 is a schematic diagram of a third apparatus for allocating a public IP address of a CGN device according to the embodiment of the present invention.

The setting unit 602 is configured for the CGN device to preset a DHCP server address, and accordingly, the destination address of the DHCP Request packet sent by the requesting unit 404 is the DHCP server address preset by the setting unit 602.

It can be seen that unified management and allocation of the public IP address of the CGN device is implemented through the apparatus provided in the embodiment of the present invention. The utilization ratio of the public IP address of the CGN device can be effectively improved by applying to the DHCP Server for the public IP address and releasing the public IP address dynamically, thereby avoiding the waste of the public IP address.

Embodiment 3

An embodiment of the present invention provides a system for allocating a public IP address, where the system includes the apparatus provided in Embodiment 2 of the present invention.

Persons of ordinary skill in the art may understand that all or a part of steps of the foregoing method embodiments may be implemented by a program instructing relevant hardware. The foregoing program may be stored in a computer readable storage medium. When the program is executed, the steps of the foregoing method embodiments are performed. The foregoing storage medium includes various mediums capable of storing program code, such as a ROM, a RAM, a magnetic disk or a compact disk.

Finally, it should be noted that the foregoing embodiments are merely used for describing the technical solutions of the present invention and not intended to limit the present invention. Although the present invention is described in detail with reference to the foregoing embodiments, persons of ordinary skill in the art should understand that they can still make modifications to the technical solution recorded in the foregoing embodiments or make equivalent replacements to some technical features in the technical solutions, and these modifications or replacements do not make the essence of the corresponding technical solutions depart from the scope of the technical solutions of the embodiments of the present invention.

What is claimed is:

1. A method for allocating a public Internet Protocol (IP) address, comprising:
   receiving, by a carrier-grade network (CGN) address translation device, a user on-line packet, and in response judging whether an idle public IP address is available in a public IP address pool;
   determining, during the judging, that the idle public IP address is not available in a situation from the group of situations consisting of:
      the public IP address pool does not contain any idle public IP addresses; and
      a current quantity of idle public IP addresses is less than a preset threshold quantity of idle public IP addresses,
   constructing and sending, by the CGN device in response to the determining that the idle public IP address is not available, a DHCP Request packet to a Dynamic Host Configuration Protocol (DHCP) Server, requesting obtaining a public IP address set, wherein a Code 61 in the DHCP Request packet comprises a number of the public IP address applied for by the CGN device,
   receiving the public IP address set from the DHCP Server, storing each public IP address of the public IP address set into the public IP address pool; and
   allocating, by the CGN device, a first public IP address in the public IP address set to a user.

2. The method according to claim 1, wherein the public IP address set comprises one or more public IP addresses.

3. The method according to claim 1, wherein a destination address of the DHCP Request packet is 0XFFFFFFFF.

4. The method according to claim 1, comprising: pre-configuring, by the CGN device, a DHCP server address, wherein accordingly, a destination address of the DHCP Request packet is a pre-configured DHCP server address.

5. The method according to claim 1, comprising: clearing a user occupied flag of the first public IP address after the user is off-line, and starting to record idle time of the first public IP address; and sending, by the CGN device, when the idle time of the first public IP address reaches a preset idle time threshold value, a DHCP Release packet to the DHCP Server to release the first public IP address.

6. The method according to claim 1, wherein after the allocating, by the CGN device, the first public IP address in the public IP address set to the user, the method further comprises:
   setting a user occupancy flag of the first public IP address as an occupied state.

7. A non-transitory computer-readable medium comprising computer-executable instructions that may be executed by a processor to perform the steps of:
   receiving a user on-line packet, and
   determining, in response to the receiving, whether an idle public IP address is available in a public IP address pool by determining that the idle public IP address is not available in a situation from the group of situations consisting of:
      the public IP address pool does not contain any idle public IP addresses; and
      a current quantity of idle public IP addresses is less than a present threshold quantity of idle public IP addresses; and
   in response to determining that the idle public IP address is not available, performing the steps of:
      constructing and sending a Dynamic Host Configuration Protocol (DHCP) Request packet to a DHCP Server requesting obtaining a public IP address set wherein a Code 61 in the DHCP Request packet comprises a number of the public IP address applied for by the CGN device, receiving the public IP address set from the DHCP Server, and storing each public IP address of the public IP address set into the public IP address pool, and allocating a first public IP address in the public IP address set to a user.

8. The non-transitory computer-readable medium according to claim 7, further comprising computer-executable instructions for performing the step of:

presetting a DHCP server address, wherein accordingly, a destination address of the DHCP Request packet sent by the requesting unit is a preset DHCP server address.

9. The non-transitory computer-readable medium according to claim 7, further comprising computer-executable instructions for performing the step of:

setting a user occupancy flag of the first public IP address as an idle state after the user is off-line, and start to record idle time of the first public IP address, and when the idle time of the first public IP address reaches a preset idle time threshold value, the CGN device sends a DHCP Release packet to the DHCP Server to release the first public IP address.

10. A system for allocating a public IP address, comprising an apparatus for allocating a public Internet Protocol (IP) address, the apparatus comprising:

a processor; and a non-transitory computer-readable medium comprising computer-executable instructions that, when executed by the processor, cause the apparatus to perform the steps of:

receiving a user on-line packet, and determining, in response to the receiving, whether an idle public IP address is available in a public IP address pool by determining that the idle public IP address is not available in a situation from the group of situations consisting of:

the public IP address pool does not contain any idle public IP addresses; and a current quantity of idle public IP addresses is less than a present threshold quantity of idle public IP addresses; and in response to determining that the idle public IP address is not available, performing the steps of:

constructing and sending a Dynamic Host Configuration Protocol (DHCP) Request packet to a DHCP Server requesting obtaining a public IP address set, wherein a Code 61 in the DHCP Request racket comprises a number of the public IP address lied for by the CGN device, receiving the public IP address set from the DHCP Server and storing each public IP address of the public IP address set into the public IP address pool, and allocating a first public IP address in the public IP address set to a user.

11. The system according to claim 10, wherein the apparatus further comprises computer-executable instructions for:

presetting a DHCP server address, wherein accordingly, a destination address of the DHCP Request packet sent by the requesting unit is a preset DHCP server address.

12. The system according to claim 10, wherein the apparatus further comprises computer-executable instructions for:

setting a user occupancy flag of the first public IP address as an idle state after the user is off-line, and starting to record idle time of the first public IP address, and when the idle time of the first public IP address reaches a preset idle time threshold value, the CGN device sends a DHCP Release packet to the DHCP Server to release the first public IP address.

\* \* \* \* \*

UNITED STATES PATENT AND TRADEMARK OFFICE
CERTIFICATE OF CORRECTION

| | | |
|---|---|---|
| PATENT NO. | : 9,210,124 B2 | |
| APPLICATION NO. | : 13/715326 | |
| DATED | : December 8, 2015 | |
| INVENTOR(S) | : Gao | |

It is certified that error appears in the above-identified patent and that said Letters Patent is hereby corrected as shown below:

In the claims

Column 10, line 11, claim 10 "racket" should read -- packet --.

Column 10, line 12, claim 10 "lied" should read -- applied --.

Signed and Sealed this
Twenty-ninth Day of March, 2016

Michelle K. Lee
*Director of the United States Patent and Trademark Office*